: US 8,615,320 B2
(45) Date of Patent: Dec. 24, 2013

(54) MACHINE TOOL MONITORING DEVICE

(75) Inventors: Reiner Krapf, Reutlingen (DE); Heiko Braun, Leinfelden-Echterdingen (DE); Michael Mahler, Leinfelden-Echterdingen (DE); Alexander Werner Hees, Bietigheim-Bissingen (DE); Philipp Pollauf, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 366 days.

(21) Appl. No.: 12/439,781

(22) PCT Filed: Sep. 4, 2007

(86) PCT No.: PCT/EP2007/059246
§ 371 (c)(1),
(2), (4) Date: Feb. 19, 2010

(87) PCT Pub. No.: WO2008/028911
PCT Pub. Date: Mar. 13, 2008

(65) Prior Publication Data
US 2010/0152882 A1 Jun. 17, 2010

(30) Foreign Application Priority Data

Sep. 4, 2006 (DE) .......................... 10 2006 041 755
Aug. 30, 2007 (DE) .......................... 10 2007 041 097

(51) Int. Cl.
*G06F 19/00* (2011.01)
(52) U.S. Cl.
USPC .................................. 700/174; 83/58; 72/169

(58) Field of Classification Search
USPC .................................. 700/174; 83/58; 72/169
See application file for complete search history.

(56) References Cited

U.S. PATENT DOCUMENTS

| 5,212,645 | A | * | 5/1993 | Wildes et al. ................. 700/108 |
| 5,414,632 | A | * | 5/1995 | Mochizuki et al. ........... 700/174 |
| 5,436,613 | A | * | 7/1995 | Ghosh et al. ................ 340/573.1 |
| 5,819,202 | A | * | 10/1998 | Sato et al. ........................ 702/33 |
| 6,041,271 | A | * | 3/2000 | Lindstrom .................... 700/175 |
| 6,604,013 | B1 | * | 8/2003 | Hamidieh et al. ............ 700/175 |
| 2004/0200329 | A1 | * | 10/2004 | Sako ................................. 83/58 |
| 2005/0145080 | A1 | * | 7/2005 | Voigtlaender .................... 83/58 |
| 2006/0218811 | A1 | * | 10/2006 | Sato ................................ 33/702 |
| 2009/0199610 | A1 | * | 8/2009 | Sato et al. ....................... 72/169 |

FOREIGN PATENT DOCUMENTS

| CN | 1500604 A | 6/2004 |
| EP | 1 061 487 | 12/2000 |
| EP | 1 422 022 | 5/2004 |
| EP | 1 514 656 | 3/2005 |
| JP | 2004160822 | 6/2004 |
| JP | 2006511770 | 4/2006 |

* cited by examiner

*Primary Examiner* — Mohammad Ali
*Assistant Examiner* — Anthony Whittington
(74) *Attorney, Agent, or Firm* — Merchant & Gould P.C.

(57) ABSTRACT

The invention relates to a machine tool monitoring device with an identification unit for identifying the operating situation of a machine tool. According to the invention, the identification unit is designed to identify an operating situation using at least one distance variable.

20 Claims, 10 Drawing Sheets

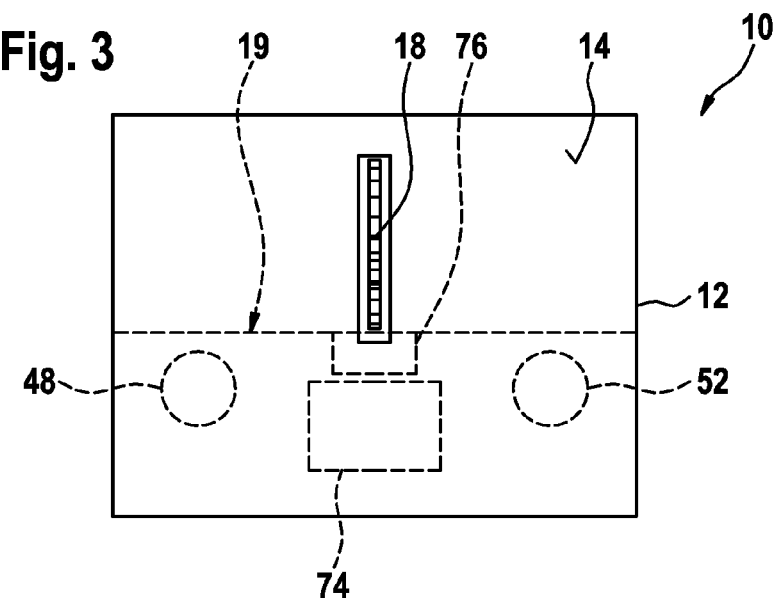
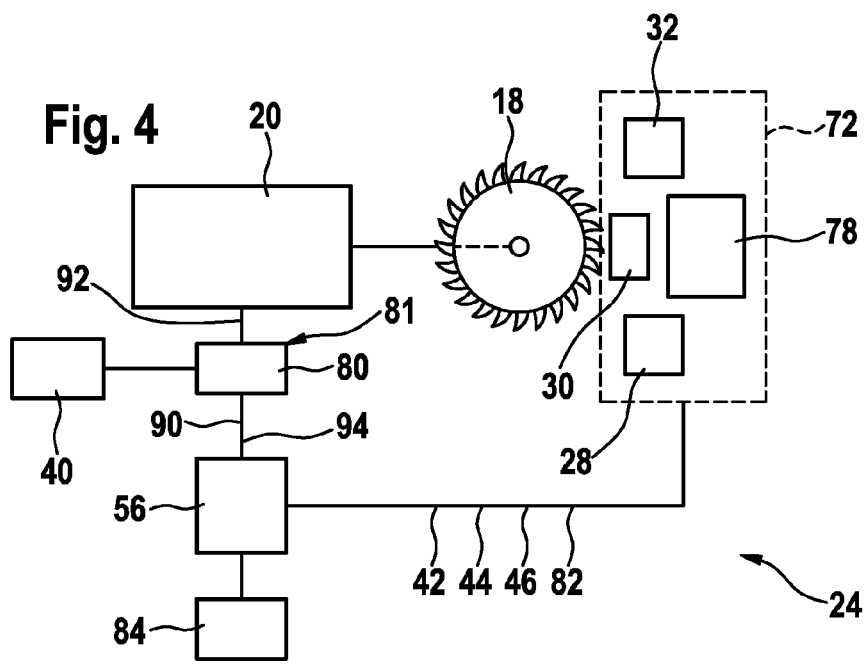

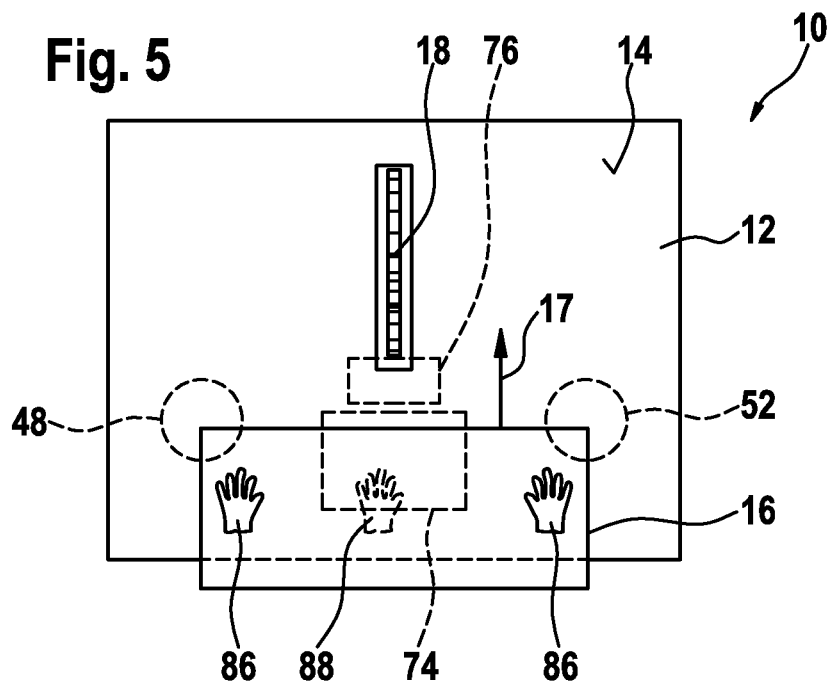
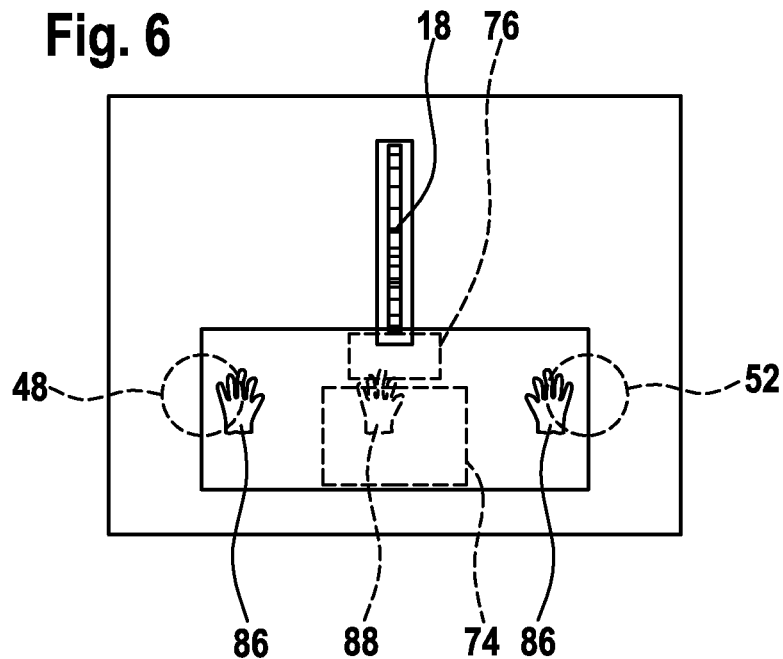

MACHINE TOOL MONITORING DEVICE

TECHNICAL FIELD

The invention is based on a machine tool monitoring device according to the generic term of claim 1.

BACKGROUND

A machine tool monitoring device for monitoring a processing of a circular saw is known. Thereby the machine tool monitoring device provides a sensor unit for creating and detecting an electromagnetic signal, which is arranged close to a saw blade. An approaching of a body part to the saw blade can be detected by monitoring the frequency spectrum of the signal.

SUMMARY

The invention is based on a machine tool monitoring device with an identification unit for identifying an operating situation of a machine tool. The operating situation can in particular comprise an unplanned or unexpected behavior of a work piece, as for example the "bouncing" of the work piece during the processing. Due to a so-called "kick-backs" it can thereby come to injuries.

It is suggested that the identification unit is designed to identify an operating situation by at least one distance variable. Thereby a secure machine tool monitoring device can be achieved that is based on established detection methods and evaluation procedures. A "distance variable" can mean in this context especially a variable, with which a distance can be determined. The distance variable is preferably detected with the aid of a detection signal, as for example an electromagnetic signal, in particular a light signal or an ultra sound signal. The distance variable can thereby be a duration, a phasing, a frequency of the detection signal or a variable that has been detected by triangulation procedure and so on. For example after receiving the detection signal these can be converted into an electric distance variable, as for example into an electric voltage, an electric current, a charge and so on. The distance variable can furthermore be evaluated for identifying the operating situation without a quantitative determination of the corresponding distance. An "identification" of an operating situation can means in this context especially the determination of the presence of a certain situation during an operating process of the machine tool. The operating process of the machine tool is thereby in particular not limited to the intended use of the machine tool. Also an inappropriate use of the machine tool and in particular a use without a work piece that has to be processed is hereby meant as operating situation of the machine tool. The determination of the presence of a certain situation can thereby advantageously serve for activating security measures.

The machine tool monitoring device according to the invention qualifies in particular for machine tools, at which an operating process is carried out by a manual controlling, as for example by handling the work piece during its processing. A particularly high security can be achieved at such work piece machining processes, in which a danger exists that an operator comes into contact with a processing tool, as for example a cutting tool. Therefore the identification unit advantageously provides at least one monitoring area, in which the distance variable is preferably detected, which is arranged in a mounting area of the machine tool for mounting a work piece at the tool. The mounting area provides preferably a guiding tool for guiding the work piece by an operator, as for example a machine tool processing surface for placing, in particular laying on a processed work piece.

For evaluating the detected distance variable, especially for determining the operating situation by the distance variable, the identification unit provides preferably one arithmetic unit, which is for example designed as microprocessor and microcontroller.

It is furthermore suggested that the identification unit is construed to identify the operating situation by a set of distance variables, whereby a particularly precise and reliable identification of the operating situation can be achieved. A high amount of possible operating situations can be simple identified by a comparison of several distance variables. A distance variable can very advantageously serve for confirming or declining a can-situation that has been determined with the aid of a further distance variable. The distance variables that serve for identifying the operating situation can correspond with different detection areas at a given point of time and/or they can be distributed over a time interval.

The identification unit preferably provides a sensor element, which is designed for detecting one or several distance variables.

It is suggested in a preferred embodiment of the invention that the identification unit provides at least two sensor elements for detecting at least one distance variable, whereby a monitoring of bigger spaces can be achieved. The sensor elements preferably provide each a field of vision or detection field, which is pointed at a machine tool processing surface for placing a work piece that has to be processed.

In order to achieve a particularly accurate and secure identification of an operating situation, it is in particular suggested that the identification unit provides at least three sensor elements for detecting a distance variable.

It is suggested in an advantageous improvement of the invention, that the identification unit provides at least two sensor elements for detecting at least one distance variable, whereby monitoring areas that have been determined by the sensor elements are arranged along a conveying direction of the machine tool, whereby a relative movement between a tool that is in process and the machine tool can be constructively monitored in a simple way. A "conveying direction of the machine tool" means in this context especially a movement direction, which is determined by the composition of the machine tool according to instructions and in which a work piece is conveyed by an operator relatively to a stationary component of the machine tool that is processed at an operating of the machine tool according to instructions, and/or a movement direction, in which at an operating of the machine tool according to instructions the machine tool is conveyed by an operator relatively to a stationary work piece that is processed. In the first alternative the conveying direction is equivalent to a tool conveying direction, while it is equivalent to a machine tool conveying direction in a second alternative. A "stationary" unit shall mean in particular a unit that is fixed to the ground. The conveying direction can especially be determined by a certain alignment of the tool, in particular the alignment of a cutting edge relatively to a machine tool housing. Two monitoring areas are arranged "along" the conveying direction if they are arranged in relation to each other in such a way that a line segment, which connects the centers of the monitoring areas, creates an angle together with the conveying direction of maximally 30°, advantageously maximally 15° and preferably maximally 5°. Preferably the monitoring areas are arranged in the conveying direction behind each other, whereby there is at least one line, which is pointed parallel to the conveying direction and which cuts the monitoring areas.

It is furthermore suggested that the identification unit provides at least two sensor elements for detecting at least one distance variable, which are arranged on both sides of a parting plane of the machine tool, whereby an identification can be achieved with a particularly high accuracy and reliability. In particular a falling down of a separated part of a processed work piece can be thereby advantageously distinguished from a dangerous situation. A "parting plane of the machine tool" means in particular a plane, in which a function edge, as for example a cutting edge, of a tool that is driven to a movement carries out a movement for parting a work piece, for example a rotation movement or a lifting movement.

A particularly simple evaluation procedure can be achieved if the identification unit is designed to identify the operating situation by a difference between distance variables. A difference between distance variables at one point of time and/or at different points of time can thereby serve for identifying the operating situation.

It is suggested in an advantageous embodiment that the identification unit is provided to identify the operating situation by a temporal change of a distance variable. Thereby a quick identification of the operating situation can be achieved. This can be particularly easily achieved if the identification unit is adjusted to detect and/or record changes with a high changing rate, as for example jerky transitions or discontinuities in the time course of the distance variables. Furthermore the identification unit can be designed for identifying default patterns in the time course of the distance variables.

It is suggested in this context that the identification unit is designed to classify the change value of the distance variable in the case of a temporal variation of at least one distance variable, whereby a particularly fast identification of a 7n operating situation can be achieved. A "classifying" of an identified variable means in particular the assigning of the variable to a predefined interval. A "change value" of the distance variable means in particular the first derivative of the distance variable in relation to the time.

Moreover it is suggested that the identification unit is designed to identify an unexpected movement of a work piece, whereby a particularly high security can be achieved for the operating of the machine tool. An "unexpected movement" of a work piece means in this context especially a movement of the work piece that is unintended by the operator or uncontrolled relatively to a machine tool component. The unexpected movement of the work piece relatively to the machine tool component can for example take place during a conveying of the work piece by an operator relatively to the stationary machine tool component or it can take place during a conveying of the machine tool component by an operator relatively to the stationary work piece.

In particular it is suggested that the identification unit is designed to identify a backwards movement of a work piece against a work piece conveying direction with the aid of at least one detected distance variable, whereby security measures can be quickly initiated at a kickback of a work piece relatively to an operator, which is caused by forces that are created between a driven tool and the work piece. A "backwards movement against a work piece conveying direction" means a movement of the work piece relative to a machine tool component, which is pointed against a conveying direction of the work piece according to instructions relative to the machine tool. Thereby a high security can be achieved especially at machine tools, which do not have mechanical security measures, as for example a cleaver or a cover, or which are removable in favor of a simple working by an end user.

It is furthermore suggested that the identification unit is designed to identify a backwards movement of the machine tool against a machine tool conveying direction with the aid of at least one detected distance variable, whereby security measures can be quickly initiated at a kickback of a machine tool in the direction of an operator. A "backwards movement against a machine tool conveying direction" means a movement of the machine tool relatively to a stationary work piece, which provides at least one component that is pointed against a conveying direction of the machine tool according to instructions relatively to the work piece.

It is suggested in an advantageous improvement of the invention that the identification unit is designed to identify a lifting movement of a work piece and/or of a machine tool component relatively to a work piece processing plane by at least one detected distance variable, whereby security measures for avoiding injuries can be initiated in time. A "work piece processing plane" means in particular a plane, along which the work piece is moving during the processing of the work piece according to instructions. At a stationary machine tool the work piece processing plane is preferably created by a machine tool processing surface, which is designed for placing the work piece. If a work piece that needs to be processed is fixed tightly for processing it in relation to the ground, the work piece processing plane is in particular equivalent to the surface of the work piece, along which the machine tool is moved. A "lifting movement" relatively to the work piece processing plane shall in particular mean a movement, which provides at least one component, which is pointed vertically to the work piece processing plane.

Advantageously the identification unit provides at least one sensor element for detecting at least one distance variable, which is designed for an ultra wide band operation. In addition to the detection of a distance variable further variables can be detected or evaluated for identifying an operating situation, as for example the presence of human tissue in a monitored area, as for example spectral variables of a receiving signal. A sensor element that is provided for an ultra wide band operation shall in particular mean an element, with which an ultra wide band signal can be created, received and/or evaluated. An "ultra wide band signal" shall in particular mean a signal, which provides a frequency spectrum with a center frequency and a frequency band width of at least 500 MHz. The center frequency is preferably selected in the frequency range of 1 GHz to 15 GHz. The sensor element can alternatively or additionally be designed as laser distance measurer, triangulation sensor, ultra sound sensor or capacitive sensor and so on. The sensor element can furthermore be arranged above or below a processing surface of the machine tool, which serves for placing, in particular laying on a work piece that needs to be processed. Furthermore at least two sensor elements can be provided, which are arrange don both sides of the processing surface.

A high flexibility in the configuration of monitoring functions can be achieved if the identification unit determines at least two monitoring areas for monitoring an operating process of the machine tool. A monitoring area is preferably assigned to a sensor element or a set of sensor elements. A monitoring area can thereby for example correspond with a detection area of a sensor element.

Moreover it is suggested that the monitoring areas are each assigned to a different operating mode of the machine tool, whereby a high flexibility can be achieved in the operation of the machine tool. Therefore the identification unit is preferably connected to a control unit of the machine tool. The operating modes can for example be equivalent to different security steps at an operation of the machine tool.

It is suggested in a preferred embodiment of the invention that at least one of the monitoring areas is assigned to a warning mode of the machine tool. Thereby pre-security measures can be advantageously initiated when detecting a potentially dangerous operating situation, before an operator is in acute danger. The operator can be warned of a possible danger for example by a warning signal. Thereby preferably a further monitoring area is assigned to a security mode for a security switch-off of the machine tool.

In this context an advantageous warning effect and a high security can be achieved, if the identification unit is designed for slowing down a tool drive in warning mode together with a machine tool driving unit for driving a tool. Therefore the identification unit provides preferably an interface, which is designed for coupling with a control unit for controlling the machine tool driving unit. Furthermore the identification unit can provide a control unit for sending a control signal to the machine tool driving unit.

It is furthermore suggested that at least one of the monitoring areas is assigned to a removing of a driven tool for a working area of the machine tool, whereby a potential injury danger can be effectively eliminated. The "removing" of the driven tool, which is preferably carried out by actuator engineering unit that has a functional connection with the identification unit, can in particular be realized by shifting the driven tool into a security position outside the working area, as for example by sinking the driven tool below a machine tool processing surface, by switching off the drive of the tool and/or by covering a cutting edge of the tool. The "working area" consists in particular of points, which are accessible for an operator under operating conditions of the machine tool according to instructions.

It is furthermore suggested that the identification unit comprises an arithmetic unit, which is designed to identify the operating situation by an evaluation of distance variables that is based on a fuzzy and/or neuronal logic. With the aid of the fuzzy and/or neuronal logic the arithmetic unit can quickly evaluate a big and complex information amount. A "fuzzy logic" can especially mean in this context a logic, which assigns the occurrence of a certain event to a probability value in the interval between 0 (false) and 1 (true).

A further embodiment suggests that the identification unit provides a data bank, in which a set of distance variables is assigned to an operating situation, whereby a simple identification process of an operating situation can be achieved. Advantageously the data bank can be programmed by an end user.

Furthermore a very high security can be achieved if the identification unit is designed to identify the presence of a human body part in a monitoring area by at least one distance variable.

The security can be further increased if the machine tool monitoring device provides an actuator engineering unit for carrying out a security measure, which has a functional connection with the identification unit. This actuator engineering unit is in particular provided to eliminate the presence of a tool that is driven to a movement in a danger zone and/or to output a warning signal to the operator by a signal of the identification unit.

Thereby an "eliminating" can mean a switching off of the tool drive or a shifting of the driven tool from the danger zone. The "danger zone" preferably consists of points, which provide the smallest distance to the driven tool of maximally 5 cm, in particular maximally 2 cm.

Moreover a procedure for identifying an operating situation during an operating process of a machine tool is suggested, at which at least one distance variable is detected for identifying the operating situation. Thereby a secure identification procedure with familiar detection elements can be simply achieved.

BRIEF DESCRIPTION OF THE DRAWINGS

Further advantages arise from the following drawing description. The drawing shows embodiments of the invention. The drawing, the description and the claims contain several characteristics in combination. The expert will consider these characteristics also individually and put them together to further useful combinations.

It is shown in:

FIG. 3 is the circular saw from FIG. 1 in a top view with an alternative monitoring device, which provides four monitoring areas, FIG. 4 is an internal circuit of the circular saw in the embodiment from FIG. 3, FIGS. 5 and 6 illustrate machining processes with the circular saw from FIG. 3, FIGS. 7 and 8 show a diagram for explaining the identification function of the monitoring device.

DETAILED DESCRIPTION

Figure 1:
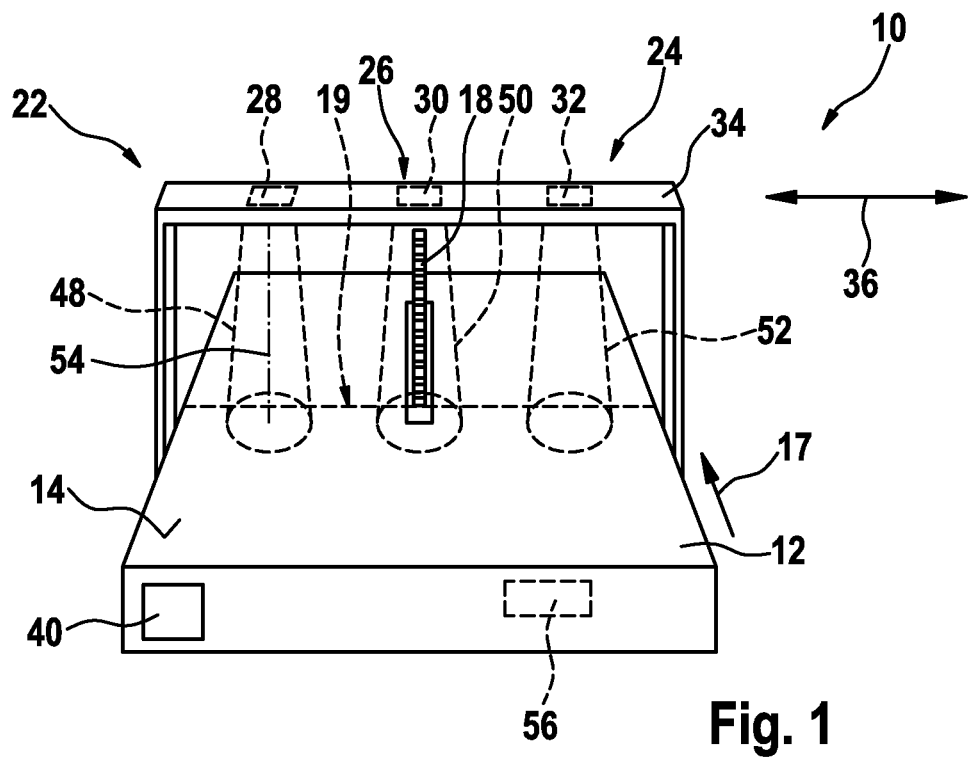
FIG. 1 is a circular saw with a saw bench, from which a saw blade is sticking out, and a monitoring device with three distance sensors.

FIG. 1 shows a machine tool 10 that is designed as a circular saw in a perspective view. It comprises a saw bench 12 with a processing surface 14, on which a work piece 16 (FIG. 5) can be placed for processing it, a tool 18 designed as a saw blade, which sticks out of the saw bench 12 and a machine tool drive unit 20 that is construed as an electromotor for driving the tool 18 (see FIG. 4). When processing the work piece 16 by an operator the work piece 16 is pushed in a mounting direction 17 against the tool 18. Therefore the part of the processing surface 14, which is arranged in a mounting direction 17 in front of the tool 18, creates a mounting area 19, on which the work piece 16 is guided. The limitation of the mounting area 19 is shown in the figure by a dotted line.

For monitoring machining processes of the machine tool 10 it is provided with a machine tool monitoring device 22. The machine tool monitoring device 22 provides an identification unit 24, which is designed to identify occurring operating situation during a machining process of the machine tool 10. The identification unit 24 provides therefore a sensor unit 26, which is construed as a set of three sensor elements 28, 30, 32. The sensor unit 26 is fixed in a pillar element 34, which spans over the width of the saw bench 12 above the processing surface 14. The sensor elements 28, 30, 32 are hereby arranged along a sensor axis 36, which is pointed transversely to the mounting direction 17 for mounting the work piece 16 to the tool 18. The machine tool 10 provides furthermore a signal output unit 40 that is construed as a loudspeaker. An optical signal output unit is also possible.

The sensor elements 28, 30, 32 are each designed as distance sensor. In this embodiment the sensor elements 28, 30, 32 are each construed as infrared sensors, which detects a distance variable 42, 44, 46 (see for example FIG. 4) with the aid of a triangulation procedure. That type of sensors as well as the detection of a distance variable by triangulation are both known, so that they are not further explained in this description. The sensor elements 28, 30, 32 determines each a monitoring area 48, 50, 52, whose projection is schematically shown on the processing surface 14 by a dotted line, within which an identification of the distance variable 42, 44 or 46 can take place. The monitoring areas 48, 50, 52 of the identification unit 24 are situated in the mounting area 19 of the processing surface 14. The distance variables 42, 44, 46 are each equivalent to a distance to an object in a corresponding monitoring area 48, 50 or 52 or, in a free monitoring area, the distance to the processing surface 14. The monitoring areas 48, 50, 52 are determined by the outreach of the corresponding sensor elements 28, 30, 32. The monitoring areas 48, 50, 52 span conically along a detection direction 54, which is pointed vertically to the processing surface 14 of the saw bench 12.

For identifying an operating situation by the distance variables 42, 44, 46 the identification unit 24 is provided with an arithmetic unit 56, which is construed as microprocessor. It is arranged under the saw bench 12 and connected to the sensor unit 26 over cable connections. An alternative arrangement of the arithmetic unit 56, as for example in the pillar element 34, is also possible.

Figure 2:
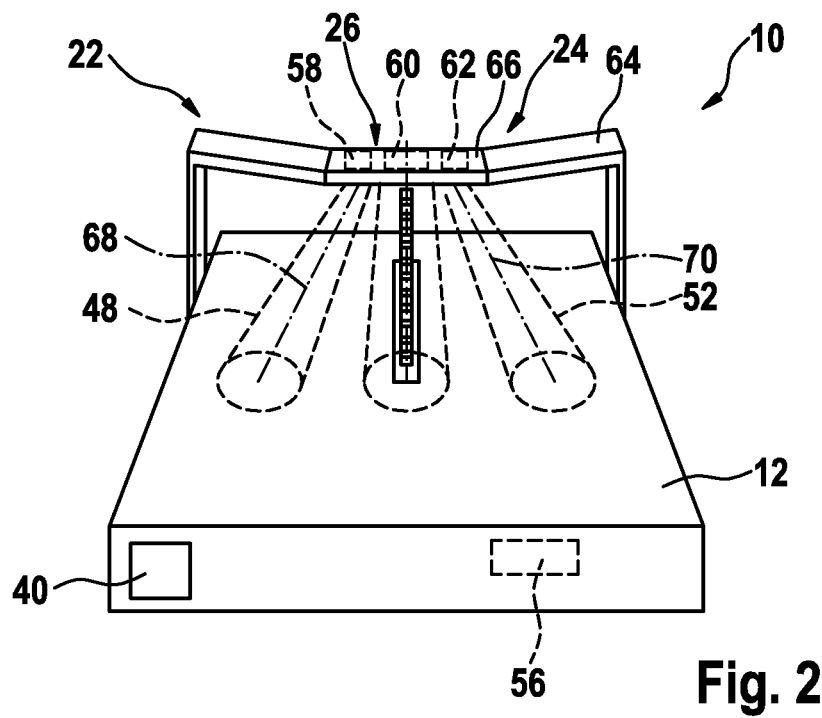
FIG. 2 is the circular saw from FIG. 1 with an alternative configuration of the monitoring device.

An alternative embodiment of the machine tool monitoring device 22 is shown in FIG. 2. The sensor unit 26 with three sensor elements 58, 60, 62 is hereby incorporated in an alternative pillar element 64. This is supported in the back area of the saw bench 12 and provides a subarea 66 for incorporating the sensor elements 58, 60, 62, which spans over a part of the width of the saw bench 12. By this arrangement of the sensor elements 58, 60, 62 in this subarea the monitoring areas 48, 52 range conically along detection devices 68, 70, which are pointed transversely to the processing area 14. In this embodiment the identification unit 24 is designed for an ultra wide band operation. The sensor elements 58, 60, 62 of the sensor unit 26 are therefore each designed as UWB-sensors (ultra wide band sensors). These are designed for detecting a distance variable by a wideband electromagnetic signal, which provides a center frequency between 1 GHz and 150 GHz and a frequency width of at least 500 MHz.

A further embodiment of the machine tool monitoring device 22 from FIG. 1 is described in FIG. 3, in which the machine tool 10 is shown in a top view. The identification unit 24 is thereby provided with an alternative sensor unit 72. For clarity reasons the illustration of the pillar element 34 from FIG. 1 and of the sensor unit 72 has been waived. The sensor unit 72 is shown in FIG. 4. The projections of the monitoring areas 48, 52 and of two further monitoring areas 74, 76 are shown on the processing surface 14. The monitoring areas 48, 52, 74, 76 are arranged in the mounting area 19 of the processing area 14. The monitoring areas 74, 76 are arranged in mounting direction 17 in front of the tool 18, whereby the monitoring area 76 is arranged in mounting direction 17 directly in front of the tool 18 and the monitoring area 74 is situated in mounting direction 17 in front of the monitoring are 76. The monitoring areas 48, 52 are arranged sideways next to the monitoring areas 74, 76, whereby the term "sideways" refers to the sensor axis 36 vertically to the mounting direction 17. The monitoring areas 48, 76, 52 are determined by the sensor elements 28, 30, 32 from FIG. 1, while the monitoring area 74 correspond with a further sensor element 78, which is shown in FIG. 4. The sensor element 78 can be designed as triangulation sensor, as UWB-sensor, or as a further distance sensor that seems to be useful for the expert.

FIG. 4 schematically shows an internal circuit of the machine tool 10. Shown are the tool 18 that is designed as saw blade, the identification unit 24, the machine tool drive unit 20, an actuator engineering unit 81 that is designed as control unit 80 for controlling a machine tool drive unit 20 and the signal output unit 40 and this signal output unit 40. The identification unit 24 provides a sensor unit 72, which comprises the sensor elements 28, 30, 32, 78, and the arithmetic unit 56. The arithmetic unit 56 is connected with the sensor unit 80 for receiving the distance variables 42, 44, 46 and a distance variable 82 that has been detected by the sensor element 78. The distance variables 42, 44, 46, 82 are designed as electrical voltages in this example, which is emitted by the sensor elements 28, 30, 32, 78 of the sensor unit 72 depending on a distance in the corresponding monitoring area 48, 76, 52 or 74. Furthermore the arithmetic unit 56 is connected with a storage unit 84.

The arithmetic unit 56 is connected in this example with the control unit 80 by a cable connection. It is possible in an alternative embodiment that the arithmetic unit 56 is arranged in the pillar element 34 (see FIG. 1) and designed for creating a data connection with the control unit 80 over a wireless connection, as for example a radio link. Thereby an optional use of the machine tool monitoring device 22 can be particularly simply achieved in combination with the machine tool 10 with a small mounting effort in particular without elaborate cabling.

Figure 7:
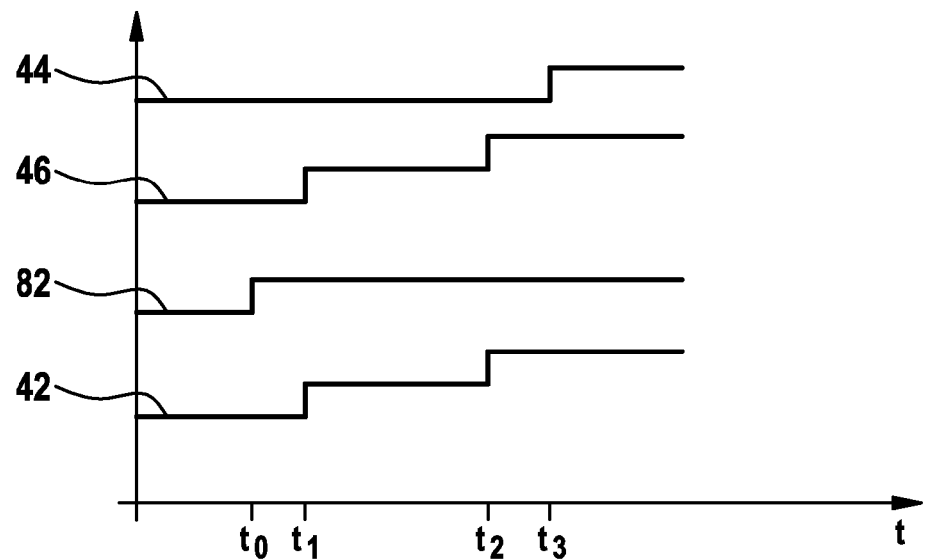
Figure 8:
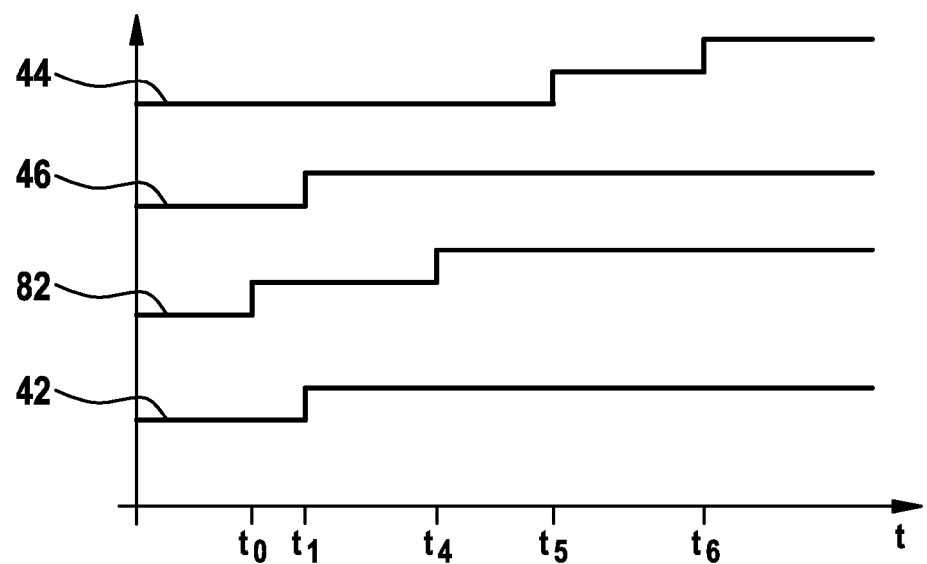

Machining processes with the machine tool 10 are explained by FIGS. 5 and 6. Furthermore it is referred to FIGS. 7 and 8 for explaining the functionality of the machine tool monitoring device 22. FIGS. 7 and 8 show the distance variables 42, 44, 46, 82, which are outputted by the sensor elements 28, 30, 32, 78 and which are construed as electrical voltages, as a function of the time t in a diagram. For clarity reasons the corresponding distance variables 42, 44, 46, 82 are each shown in a separate are of the ordinate. The distance variables 42, 82, 46 or 44 are each assigned to the sensor elements 28, 78, 32 or 30.

It is assumed that an operator undertakes the machining of the work piece 16 that is designed as a wood shelf by the machine tool 10. Before placing the work piece 16 on the processing surface 14 the detected distance variables are equivalent to the same distance, thus the distance of the sensor elements 28, 78, 32, 30 to the processing surface 14. The work piece 16 is placed on the processing surface 14 and moved by the operator in mounting direction 17 towards the tool 18. At the point of time t0 the work piece 16 gets into the monitoring area 74. As it can be seen in FIG. 7, the distance variable 82 provides a jerky transition, which corresponds with the reduction of the distance by the thickness of the work piece 16 in the monitoring area 74. At the point of time $t_1$ the work piece 16 gets into the monitoring area 48 and 52, whereby the distance variables 42, 46 provide a jerky transition. It is furthermore assumed that the hands of the operator are situated at the edges of the work piece 16 (drawn through hand symbols 86) when moving the work piece 16 in mounting direction 17. When moving the work piece 16 further the hands of the operator gets each in one of the monitoring areas 48, 52 at a point of time $t_2$ (FIG. 6). This is registered by the sensor elements 28, 32 (see FIG. 7). At a later point of time $t_3$ the work piece 16 gets into a monitoring area 76.

The arithmetic unit 56 is programmed for identifying operating situations by a logical method. An application situation is achieved as a result of a logical survey chain. The arithmetic unit 56 monitors thereby differences between the distance variables 42, 82, 46 on the one hand and on the other hand it registers the temporal course of all distance variables. Especially the number of jerky transitions is registered for each distance variable. The corresponding evaluation program is stored in the storage unit 84.

Between the points of time $t_1$ and $t_2$ all differences between the distance variables 42, 82, 46 equal zero. The arithmetic unit 56 interprets this as a secure operating situation, for which no further measures are necessary. If the hands get into the monitoring areas 48, 52 at the point of time $t_2$, a difference of the distance variables 42, 46 to the distance variable 82 is registered. This activates another step in the logical identification procedure, in which each status of the distance variables as well as their courses are used. The arithmetic unit 56 determined in particular that the distance variable 44 is still in its starting status at the point of time $t_2$. This is again identified as an operating situation, for which no further measures are necessary.

It is registered at the point of time $t_3$ that the distance variable 44 changes its value. With the aid of this information the arithmetic unit 56 examines the statuses of the further distance variables. Because the values of theses distance variables are unchanged, which corresponds with the further presence of the hands in the monitoring areas 48, 52, this is recognized by the arithmetic unit 56 as an uncritical operating situation.

It is now assumed that the operator has put a hand on the center point of the work piece 16. This is described by the diagram in FIG. 8. This situation is shown in FIGS. 5 and 6 by a dotted hand symbol 88. The work piece 16 gets into the monitoring area 74 like in the previous embodiment at the point of time to. At the point of time $t_4$ the hand gets into the monitoring area 74 (FIG. 5), which is expressed by a jerky transition of the distance variable 82. Moreover the work piece 16 gets into the monitoring area 76 at the point of time $t_5$. At the point of time $t_4$ the hand gets into the monitoring area 74. Thereby a difference of the distance variable 82 to the distance variables 42, 46 arises, which is registered by the arithmetic unit 56. The arithmetic unit 56 determines furthermore that a second discontinuity of the distance variable 82 is present. In the logical chain of the arithmetic unit 56 this is identified as an operating situation, in which a warning mode of the machine tool 10 has to be turned on. Therefore the arithmetic unit 56 outputs a warning signal 90 to the actuator engineering unit 81 (FIG. 4), which causes the output of an acoustic signal by the signal output unit 40 on the one hand and on the other hand sends a control signal 92 to the machine tool drive unit 2. Thereby for example the engine speed of the tool 18 is adjusted to a smaller value.

If the operator ignores the warnings and his hand gets into the monitoring area 76 at a point of time $t_6$, the corresponding second jerky transition of the distance variable 44 is registered by the arithmetic unit 56, which identifies this operating situation as an acute danger situation. Thereby the arithmetic unit 56 gives a stop signal 94 to the actuator engineering unit 81, which causes a security switch off of the machine tool drive unit 20. It is possible in a further embodiment that the actuator engineering unit 81 serves in this operating situation for driving a security tool, which is provided for shifting the driven tool 18 in a security position outside the working area of the machine tool 10 and/or for covering the cutting edge of the tool 18.

Due to the identification unit 24, which releases the warning signal 90 and the stop signal 94 by reducing the distance in the monitoring areas 74 or 76, a wrong negative identification can be excluded, in which the danger of an operating situation is underestimated. By the further monitoring areas 48, 52 in particular by a comparison between the distance variables, furthermore false positive identifications can be advantageously prevented, in which a warning or a security switch off is caused by overestimating the danger of an operating situation. For preventing the output of such false positive signals and for increasing the operating comfort the above described sensor technology can be advantageously combined with a further sensor technology by distance sensors in particular for a material identification. The additional use for example of a capacitive identification and/or an identification, which is based on the application of an infrared sensor for detecting body heat, on a spectroscopic method for detecting human tissue and/or on an optical method, for example a video camera, is also possible. This can be achieved by the use of further sensor elements. That can constructively be achieved in a simple way thereby that at least the sensor element 30 is provided in addition to the distance detection for a material detection.

The functionality of the machine tool monitoring device 22 in the version of FIG. 1 can be taken from the previous description, with the difference that the monitoring area 74 is waived. This monitoring area 74, which can be considered as warning area, has the additional advantage, that it can be reacted upon a critical operating situation, before a physical contact between the operator and the tool 18 occurs.

For explaining the functionality of the machine tool monitoring device 22 simple examples of operating situations have been considered, by which an operating situation can be quickly and securely identified by an arithmetic unit 56 that is programmed with a sharp logic. By detecting a set of distance variables a variety of possible configurations of the distance variables is created. For an effective identification of the operating situation the arithmetic unit 56 is furthermore designed to identify the operating situation by a fuzzy logic and a neuronal logic. By a neuronal logic further advantageous self-learning functions of the machine tool monitoring device 22 can be achieved.

Figure 9:
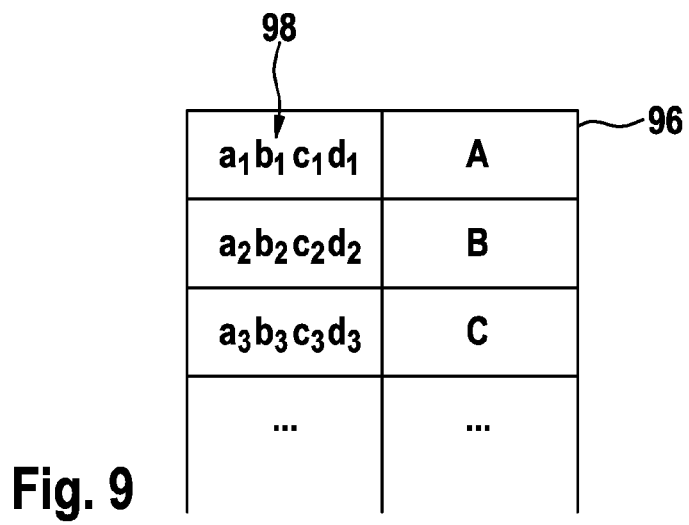
FIG. 9 is a data bank of the monitoring device.

The arithmetic unit 56 can furthermore identify an operating situation by a data bank 96 that is saved in the storage unit 84. This data bank 96 is shown in FIG. 9. In this data bank 96 sets of distance variables 98, which are shown by the symbols $a_1, a_2, \ldots, b_1, b_2, \ldots, c_1, c_2$ and so one, are each assigned to an operating situation A, B, C and so on. By comparing a detected set of distance variables with the saved sets a corresponding operating situation can be identified. This data bank 96 can for example be created by a computer simulation, in which possible operating situations are simulated, and subsequently saved in the storage unit 84 in series.

It is possible in a further embodiment that the identification unit 24 is designed for a pattern identification. Therefore the arithmetic unit 56 registers absolute values of distance variables or of distances that have been detected by these distance variables. Thereby the arithmetic unit 56 can be for example programmed to identify a typical hand thickness (for example in a thickness range between 2 and 5 cm).

Figure 10:
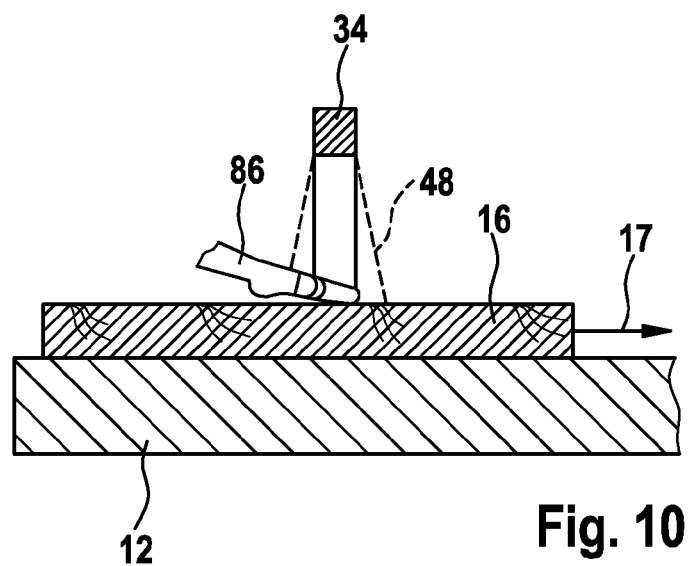
FIG. 10 shows a saw bench, a work piece and a hand that is put on the work piece.
Figure 11:
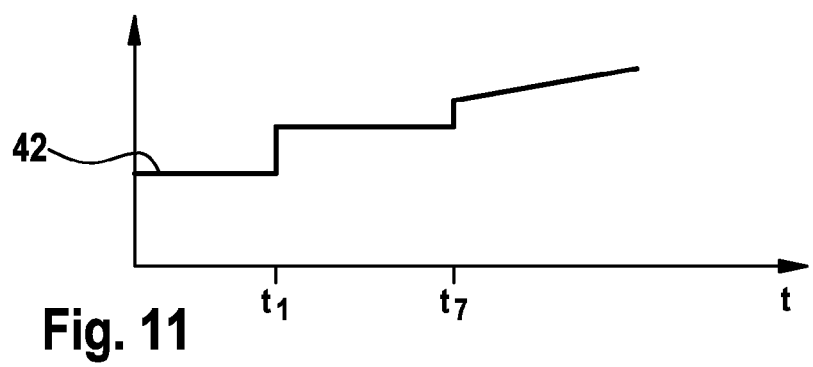
FIG. 11 shows the course of a distance variable in the situation from FIG. 10.

A further identification mode of the arithmetic unit 56 is described in FIGS. 10 and 11. A hand can be distinguished from a work piece 16 thereby that the arithmetic unit 56 registers a continuous change in the course of a distance variable, as for example the distance variable 42. This variation, which can be noticed in FIG. 11 from the point of time $t_7$ of the entering of the hand into the monitoring area 48, corresponds with a transverse position of the hand on the work piece 16 and a thereby occurring reduction of the detected distance and can be identified by the arithmetic unit 56 as a pattern course of the distance variable 42.

The machine tool monitoring device 22 that is here described by a circular saw can be furthermore suitable for the use at further machine tools, in particular at further types of saws, as for example chop and/or miter saws, at lawnmowers and so on.

Figure 12:
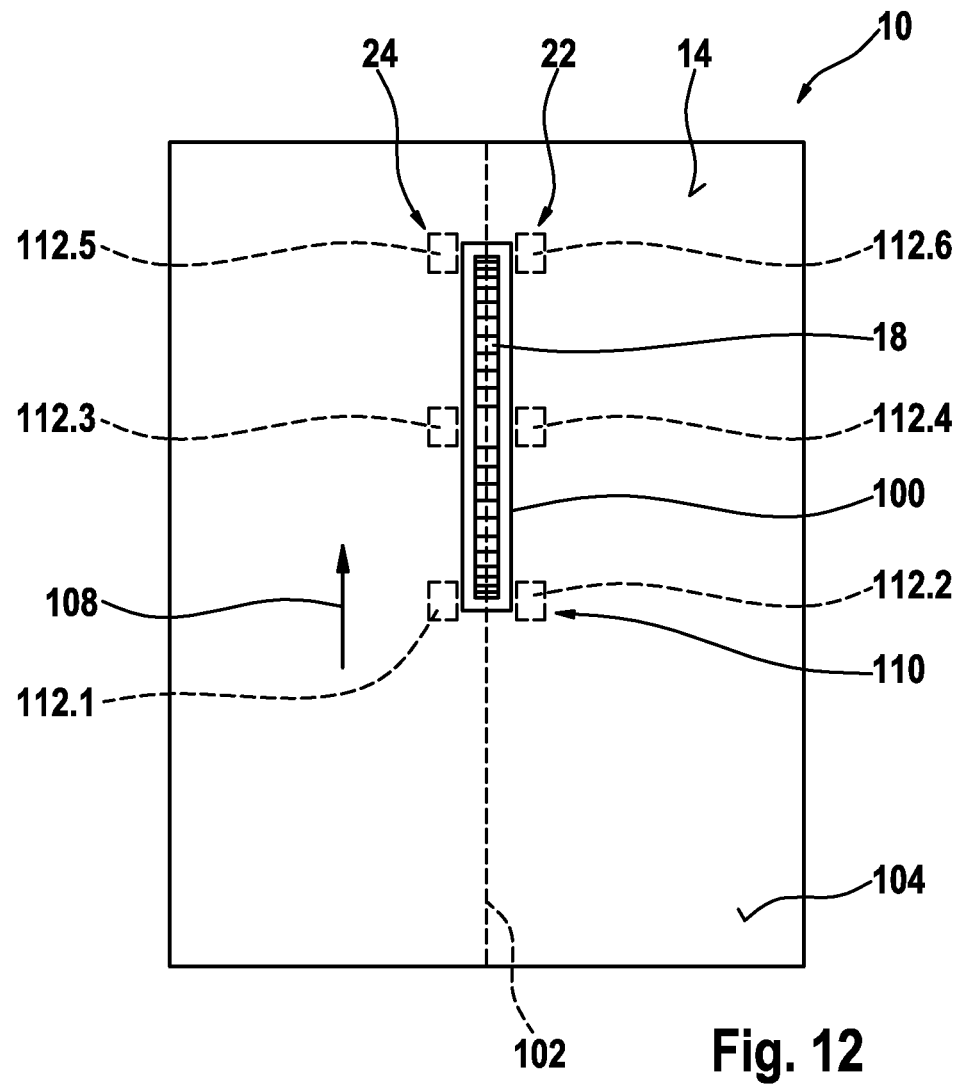
FIG. 12 shows the circular saw of FIG. 1 with an alternative implementation of a sensor unit of the monitoring device on both sides of the saw blade.

FIG. 12 shows the machine tool 10 in a top view. The machine tool 10 provides the tool 18, which is designed as a saw blade, especially a circular saw blade, and which sticks out of the machining surface 14 that is designed as a saw bench for placing the work piece, in particular by a gap 100 that has been omitted in the machining surface 14. The tool 18 can furthermore be designed as a band saw. During operating situations according to instructions the processing surface 14 is pointed horizontally and the tool 18 sticks out of the processing surface 14 in vertical direction 101 (see also FIG. 13). The tool 18 is driven to a rotation in a tool drive by the machine tool drive unit 20. This drive movement of the tool 18 defines a parting plane 102, in which the cutting edge of the tool 18 is driven to rotation for separating a work piece. In the considered case the parting plane 102 is equivalent to a vertical plane, which includes the focus of the tool 18 and which is pointed vertically to the rotation axis of the work piece. When processing the work piece the parting plane 102 and a desired cutting line of the work piece are brought into line. The processing surface 14 corresponds with the work piece processing plane 104, along which a work piece 106 (see FIG. 13) that has to be processed is moved at a processing according to instructions. During this processing according to instructions the work piece 106 is pushed in work piece conveying direction 108, thus work piece pushing direction, along the work piece processing plane 104 (see FIG. 13). The work piece conveying direction 108 is determined by the alignment of the prating plane 102 and is hereby parallel to the work piece processing plane 104 and to the parting plane 102.

The machine tool 10 is provided with the machine tool monitoring device 22 with its identification unit 24 as it described above. The identification unit 24 provides an alternative implementation of a sensor unit 110. The sensor unit 110 comprises a set of six sensor elements 112.1 to 112.6. The sensor elements 112 are each construed as distance sensor, which is designed for detecting at least one distance variable 114 (see FIG. 14). In the considered case the sensor elements 112 are each designed as ultra wide band radar sensors. For designing the sensor elements 112 alternatively or additionally different sensor types can be considered. The use of optical sensors, which serve for detecting a distance variable by an infrared radiation and/or a laser radiation, is possible. In this context the sensor elements 112 can be designed as triangulation sensors or as laser distance measurers. Furthermore the construction of the sensor elements 112 as acoustic sensors is possible, as for example as ultra sound distance measurer. Also possible is the use of capacitive sensors, which detect a distance variable by a capacitive measurement. In one embodiment a combination of these sensor types is possible.

The sensor unit 110 provides two groups of sensor elements 112, namely a first group with the sensor elements 112.1, 112.3, 112.5 and a second group with the sensor elements 112.2, 112.4, 112.6, whereby these groups are arranged on both sides of the parting plane 102. Within a group the sensor elements 112 are arranged along the work piece conveying direction 108. Hereby they are arranged behind each other in work piece conveying direction 108 and create a row, whereby the row direction is equivalent to the work piece conveying direction 108. The sensor elements 112.2, 112.4, 112.6 determine each a monitoring area 115.2, 115.4, 115.6, whereby the monitoring areas 115.2, 115.4, 115.6 are arranged in row along the work piece conveying direction 108. The arrangement of the sensor elements that is shown in FIG. 12 is exemplary. A configuration, in which the sensor elements 112 are only arranged on one side of the parting plane 102, is possible. A further configuration is possible, in which the sensor elements 112 are arranged offset relatively to the parting plane 102.

Figure 13:
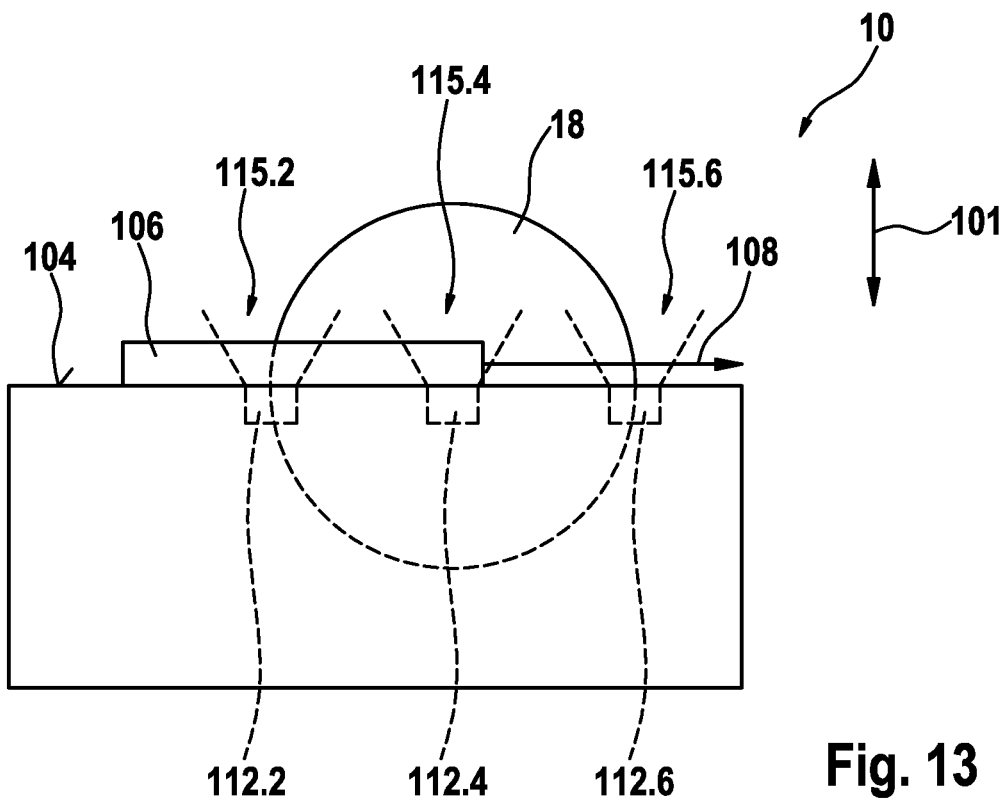
FIG. 13 shows the circular saw of FIG. 1 during a processing of the work piece according to instruction.
Figure 14:
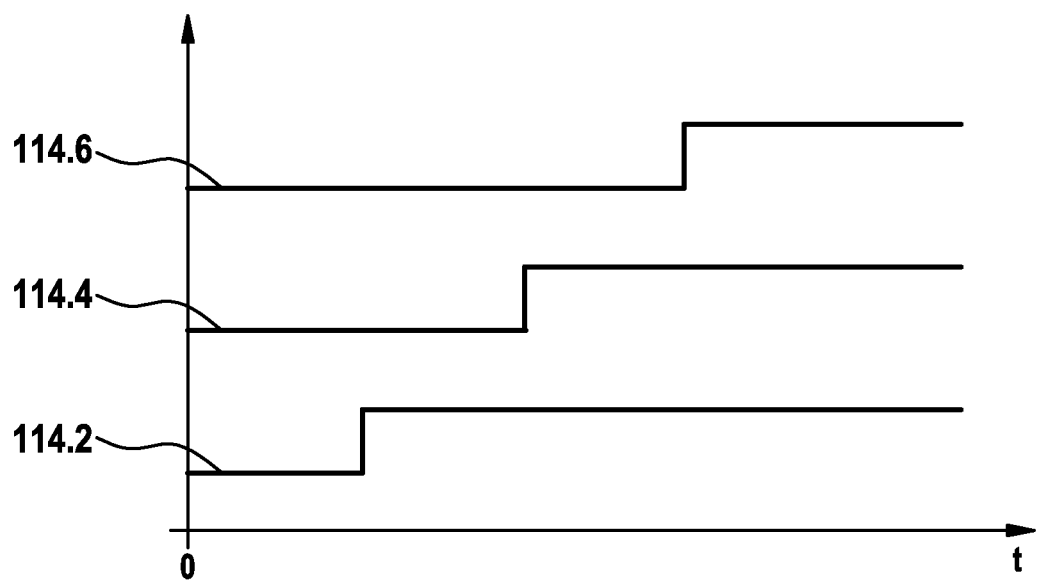
FIG. 14 shows the courses of distance variables of the sensor unit from FIG. 12 during the operating situation from FIG. 13.

The functionality of the identification unit 24 in the construction with the sensor unit 110 is described by FIGS. 13 to 16. The illustration of the internal circuit of the machine tool 10 with the identification unit from FIG. 4 is applied correspondingly, whereby the sensor unit 72 is replaced by the sensor unit 110. In FIG. 13 the machine tool 10 is shown in a side view. The sensor elements 112 are arranged below the processing surface 14, as it can be taken from the illustration in FIG. 13. In this figure a processing of the work piece 106 according to instructions is shown, whereby it is pushed in the work piece conveying direction 108 by an operator along the work piece processing plane 104 relatively to the machine tool 10, which is designed stationary relatively to the ground. The course of distance variables 114.2, 114.4 or 114.6 that have been detected by the sensor elements 112.2, 112.4, 112.6 is shown in FIG. 14 as function of the time t, in which the successive intervention of the work piece 106 into the corresponding monitoring area 115.2, 115.4 or 115.6 of the sensor elements 112.2, 112.4, 112.6 can be identified by the jerky transitions. The initial value of a distance variable 114 at the point of time t=0 is equivalent to an uncovered status of the corresponding sensor elements 112.2, 112.4 or 112.6.

The identification unit 24 in the configuration with the sensor unit 110 is designed to identify an unexpected movement of the work piece 106, namely in the considered example an abrupt removing of the work piece 106 from the processing surface 14. This is shown in schematically in FIG. 15. In this operating situation the work piece 106 experiences a force due to a canting at a point of time $t_1$, which provides a component in vertical direction 101 upwards and a component against the work piece conveying direction 108. Thus the work piece 106 lifts from the work piece processing plane 104 in vertical direction 101 upwards and carries out a backwards movement, which means it moves against the work piece conveying direction 108 towards the operator. The corresponding course of the distance variables 114 is shown in FIG. 16. For identifying the operating situation the corresponding temporal changes of the distance variables 114 as well as a comparison between the detected distance variables 114 are evaluated.

An unexpected or uncontrolled movement of the work piece 106 relatively to the machine tool 10 can be identified from a comparison of the momentary values of the distance variables 114.2 and 114.4. In particular it is registered by the arithmetic unit 56 that a change of the distance variable 114.4 at the point of time $t_1$, which indicates a change of the distance from the sensor element 112.4 to the work piece 106, takes place, whereby the value of the distance variable 114.2 at the point of time $t_1$ indicates a further covered status of the sensor element 112.2. This identification causes an identification signal by the identification unit 24, by which security measures are activated.

Furthermore an unplanned movement of the work piece 106 can be identified by an evaluation of the change values of the distance variables 114. If one of the change values exceeds a default threshold value, the arithmetic unit 56 can distinguish an abrupt movement of the work piece 106 relatively to a work piece processing plane 104 from a movement, which is planned by the operator and therefore undertaken. The change values are hereby classified by the arithmetic unit 56 by assigning a momentary change value to a danger rate, as for example "normal change" or "abrupt change". Different danger rates can be assigned to different security measures. In the considered example the change value of the distance variable 114.4 at the point of time $t_1$ is assigned to the danger rate "abrupt change", whereby an identification signal of the identification unit 24 is causes for activating security measures.

Figure 15:
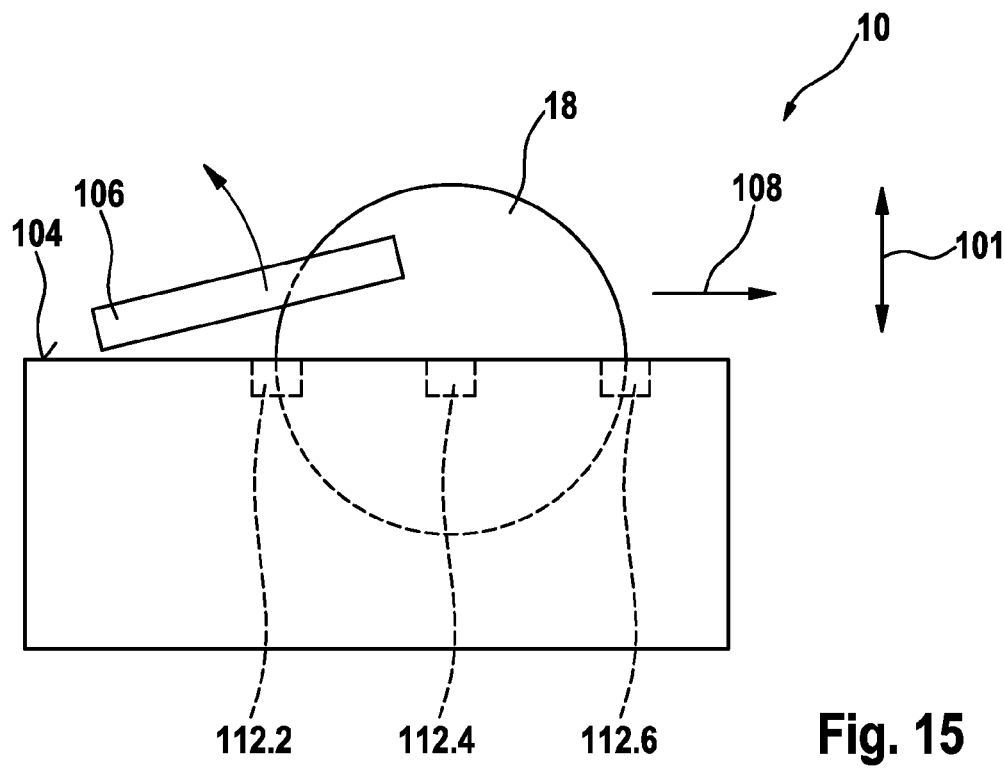
FIG. 15 shows the circular saw of FIG. 1 during a kickback of the work piece.
Figure 16:
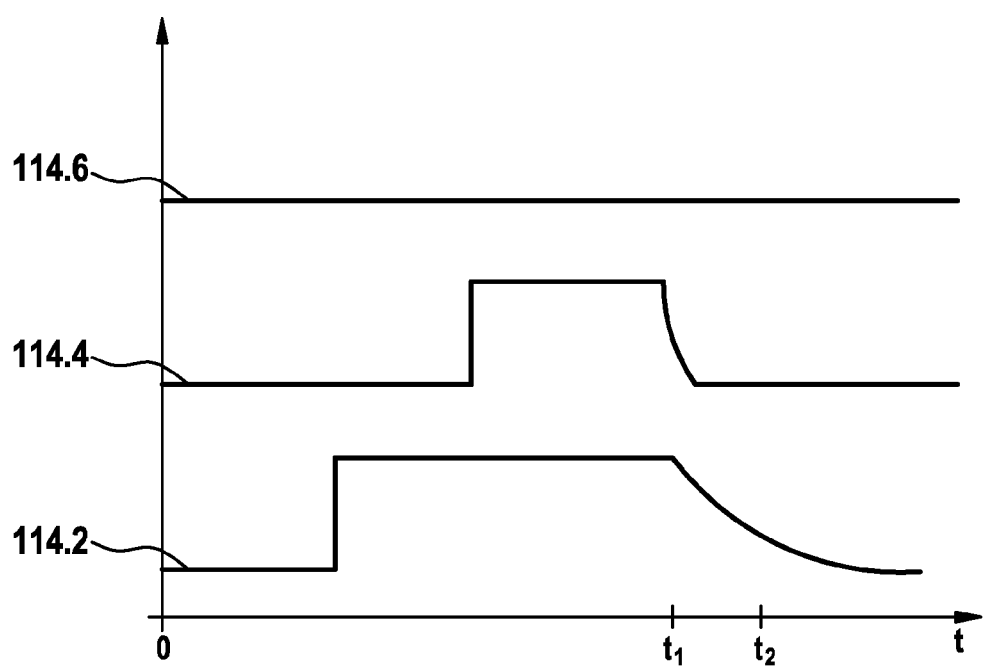
FIG. 16 shows the courses of distance variables during the operating situation from FIG. 15, FIG. 17 a portable circular saw from a side view with the sensor unit from FIG. 12.

Furthermore the movement of the work piece 106 relatively to the work piece processing plane 104 in its direction that is shown in FIG. 15 can be characterized by the identification unit 24. The arithmetic unit 56 registers hereby that a simultaneous change of two distance variables 114.2 and 114.4 at the point of time $t_1$ takes place, which indicates a lifting movement of the work piece 106 from the work piece processing plane 104.

Furthermore the backwards movement component of the work piece 106 against the work piece conveying direction 108 can be identified by the identification unit 24. This can be already thereby identified that the distance variables 114.2, 114.4 have different values after the point of time $t_1$, which indicates the transverse position of the work piece 106 relatively to the work piece processing surface 104 as it is shown in FIG. 15, in which the distance of the work piece 106 to the sensor element 112.4 is bigger than to the sensor element 112.2. The backwards movement can furthermore be carried out and evaluated by the arithmetic unit 56 by comparing the change values of the distance variables 114.2 and 114.4. The arithmetic unit 56 can in particular register that the distance variable 114.4 has a bigger change value than the distance variable 114.2. This indicates that the distance of the work piece 106 to the work piece processing surface 104 increases faster in the monitoring area 115.4 of the sensor element 112.4 than it does in the monitoring area 115.2 of the sensor element 112.2. Therefore it can be realized that a tossing the work piece 106 with a backwards movement in the direction of the operator takes place, which is shown schematically in FIG. 15 by the curved arrow. This backwards movement can furthermore be also identified thereby that the distance variable 114.4 indicates its initial value at the point of time $t_1$, while the distance variable 114.2 corresponds with a further covered status of the sensor element 112.2.

Further combinations of the monitoring of the distance variables 114 for identifying an unexpected movement of the work piece 106 relatively to the machine tool 10 are possible. As it was mentioned above, the here described identifications can take place by using data of the data bank 96. By an identification signal of the identification unit 24 different security measures can be undertaken. As described above a security switch-off of the machine tool drive unit 20 can be triggered by the actuator engineering unit 81. It is furthermore possible that the actuator engineering unit 81 carries out the drive of a mechanic security measure, which for example drives a sinking of the tool 18 below the work piece processing surface 104 and/or a covering of the cutting edge of the tool 18.

In a further embodiment it is possible that the machine tool 10 provides a protection device, which is designed as a cleaver and which is arranged in the work piece conveying direction 108 behind the tool 18. This protection device can be construed as pillar unit for carrying at least one further sensor element for detecting a distance variable, which is arranged above the piece processing surface 104.

Figure 17:
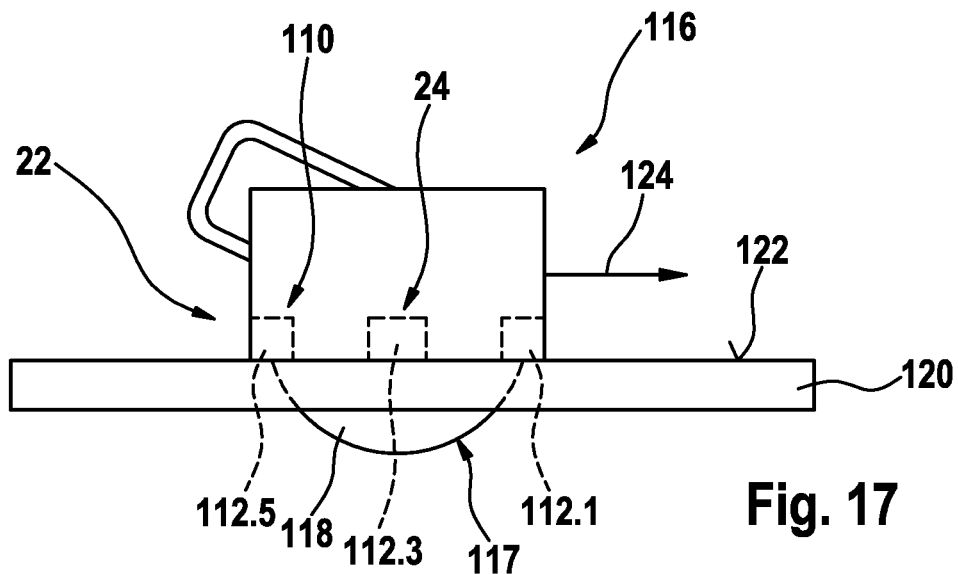

FIG. 17 shows the side view of a machine tool 116 that is designed as a portable circular saw. It provides a machine tool component 117, which is designed as a tool 118 in the form of a circular saw blade. The tool 118 is driven in the operation to a rotation by not further shown machine tool drive unit. This rotation movement defined a parting plane as described above. In FIG. 17 a work piece 120 is fixed in a position relative to the ground by a not further shown element. During an operating according to instructions the machine tool 116 is moved at a surface of the work piece 120, whereby this surface that is facing the machine tool 116 defines a work piece processing plane 122. In particular the machine tool 116 is pushed according to instructions in a machine tool conveying direction 124 relatively to the work piece 120, which is parallel to the parting plane and to the work piece processing plane 122.

The machine tool 116 is provided with the machine tool monitoring device 22. It provides the identification unit 24, which comprises the sensor unit 110 with the sensor elements 112. Like in the configuration that is shown in FIG. 12 the sensor unit 110 is divided into two groups of sensor elements 112, which are arranged on both sides of the parting plane. Furthermore the sensor elements 112 within a group are arranged in a row along the machine tool conveying direction 124.

Figure 18:
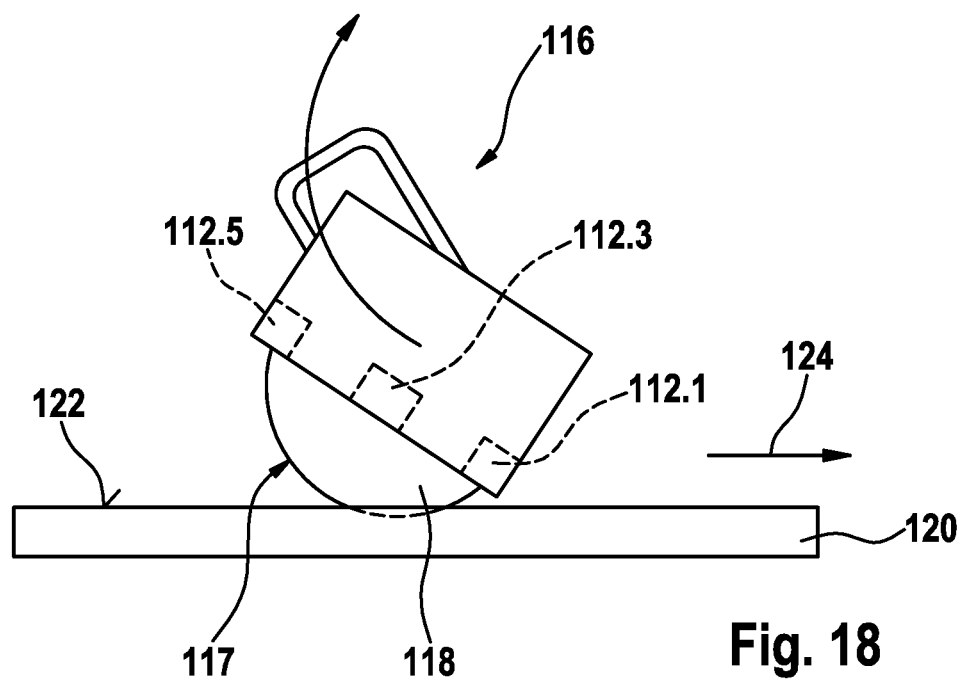
FIG. 18 shows the portable circular saw of FIG. 17 during a lifting of a work piece.

FIG. 18 shows the machine tool 116, which carries out a movement relative to the work piece processing plane 122 that is unwanted by the operator. Thereby a canting of the tool 118 takes place in the work piece 120, so that a lifting movement of the machine tool 116 relative to the work piece processing plane 122 takes place. The movement of the machine tool 116 relative to the work piece 120 furthermore contains a component, which is pointed against the machine tool conveying direction 124, thus the work piece 120 carries out a backwards movement against the machine tool conveying direction 124.

Figure 19:
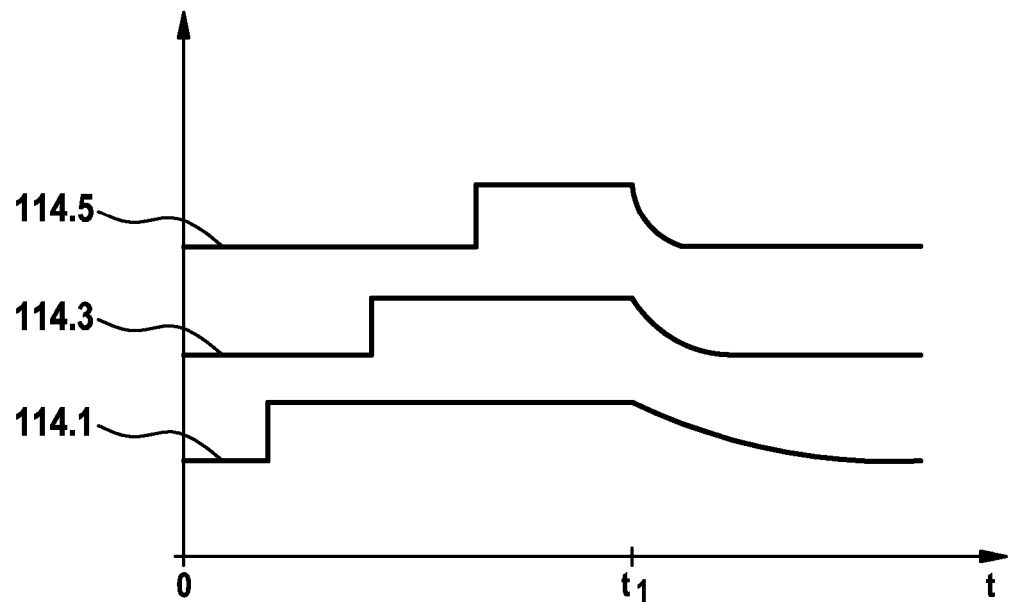
FIG. 19 shows the courses of distance variable during the operating situation from FIG. 18.

The course of the distance variables 114.1, 114.3, 114.5, which are assigned to the sensor elements 112.1, 112.3 or 112.5 that are shown in FIG. 18, are shown as a function of the time t in FIG. 19. From the point of time t=0 to the point of time $t_1$ of the canting the sensor elements 112.1, 112.3, 112.5 are successively covered by the work piece 120, as it has been explained above by FIG. 14. A simultaneous change of the distance variables 114 at the point of time $t_1$, which indicates a lifting movement of the machine tool 116 from the work piece processing plane 122, is registered by the arithmetic unit 56. The arithmetic unit 56 furthermore carries out a comparison of the momentary change values of the distance variables 114. Thereby it can be realized that the distance of the sensor element 112.5 to the work piece 120 increases faster than the distance of the sensor element 112.1 to the work piece 120. This indicates that the tool 118 carries out a movement in the direction of the operator, which means with at least one component against the machine tool conveying direction 124. This is identified by the arithmetic unit 56 as a dangerous situation, whereby security measures, especially the stopping of the drive of the tool 118, are activated. The description of FIG. 16 can furthermore be applied correspondingly. A further security measure is the triggering of a machine protection device, as for example a cover for covering the cutting edge of the tool 118. It is further possible in one embodiment that stabilization measures are activated for stabilizing the machine tool 116, as for example counterbalance elements for balancing the abrupt lifting movement.

For increasing the reliability of the identification unit 24 it can be provided with an additional sensor, which is a sensor that is redundant towards the sensor unit 110. The identification unit 24 can in particular be provided with an accelerating sensor in addition to the sensor unit 110.

Figure 20:
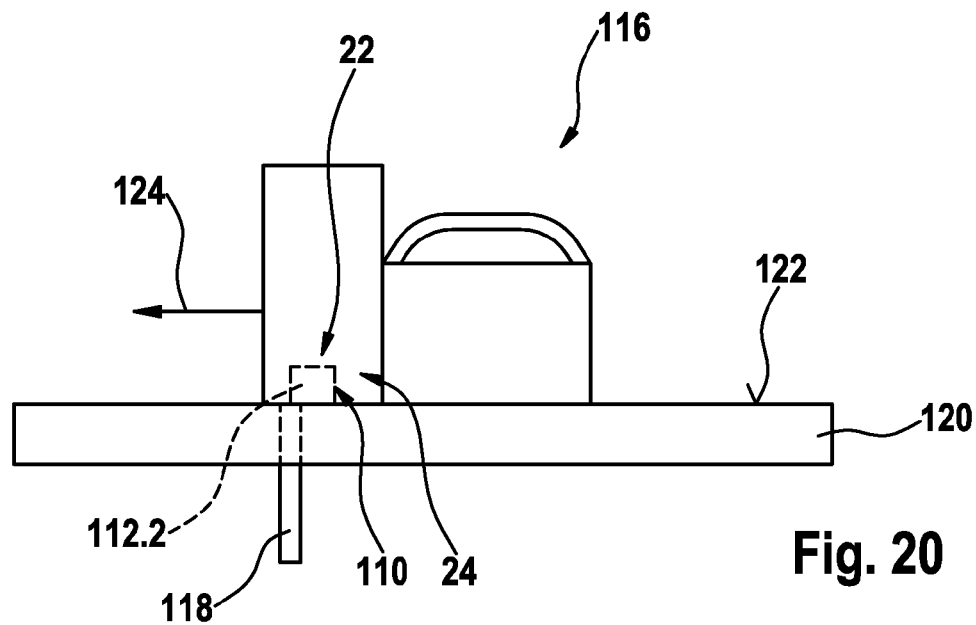
FIG. 20 is a jig saw from a side view with an alternative sensor unit.

FIG. 20 shows an alternative configuration of the machine tool 116. It is designed as jigsaw, with a configuration of the tool 118 as a longish saw blade. Regarding the configuration according to FIG. 16 components with the same function have the same reference signs. The tool 118 is driven in a tool drive to a lifting movement vertical to the work piece processing plane 122. This movement defines a parting plane, which includes the center point of the tool 118, vertical to the work piece processing plane 122 and parallel to the length sides of the saw blade. The machine tool 116 is pushed according to instruction by the operator as described above in machine tool conveying direction 124. The sensor unit 110 provides a pair of sensor elements 112.1, 112.2, which are arranged on both sides of the parting plane. In the case of a canting of the tool 118 or in the case of the tool 118 a hitting upon an obstacle that is below the work piece 120 the machine tool 116 can carry out a lifting movement relative to the work piece processing plane 122. This can take place with the aid of the identification unit 24 by an evaluation of distance variables 114 that have been detected by the sensor elements 112, which is here not further described to avoid repetitions. As a security measure a security switch-off of the drive of the tool 118 can take place like described above for example by switching of a machine tool drive unit or by uncoupling the tool 118 from the machine tool drive unit.

An arrangement of sensor elements 112 on both sides of a parting plane is particularly advantageous at a configuration of the machine tool 116, in which the processing of a work piece takes place by handling the machine tool 116 by an operator. Thereby the identification unit 24 can distinguish an operating situation, in which a chopped piece of the work piece is separated and for example falls on the operator, from an operating situation, in which the machine tool 116 is separated from the work piece processing plane 122.

The invention claimed is:

1. A machine tool monitoring device, comprising:
   an identification unit for identifying an unexpected or inappropriate use of a work piece on a machine tool, wherein the identification unit is configured to identify the unexpected or inappropriate use using at least one distance variable, the identification unit configured to identify the unexpected or inappropriate use with the aid of a set of distance variables, wherein identification of the unexpected or inappropriate use is based on a difference between a plurality of distance variables of the set of distance variables; and
   at least two sensor elements for detecting the at least one distance variable, wherein the at least one distance variable is a vertical distance between at least one of the sensor elements and at least one of: a work piece processing plane and a work piece lying on the work piece processing plane, wherein the at least two sensor elements are each arranged to designate a monitoring area along a conveying direction of the machine tool, and wherein at least two sensor elements of the at least two sensor elements are arranged on a first and second side of a parting plane of the machine tool each for detecting at least one distance variable of the set of distance variables.

2. The machine tool monitoring device of claim 1, wherein the identification unit is configured to identify the unexpected or inappropriate use by a temporal change of one or more of the set of distance variables.

3. The machine tool monitoring device of claim 2, wherein the identification unit is configured to classify a change value of a distance variable at a temporal change of at least one distance variable of the set of distance variables.

4. The machine tool monitoring device of claim 1, wherein the identification unit is configured to identify an unexpected movement of the work piece.

5. The machine tool monitoring device of claim 1, wherein the identification unit is configured to identify a backwards movement of the work piece against a work piece conveying direction by at least one detected distance variable.

6. The machine tool monitoring device of claim 1, wherein the identification unit is configured to identify a backwards movement of the machine tool against a machine tool conveying direction by at least one detected distance variable.

7. The machine tool monitoring device of claim 1, wherein the identification unit is configured to identify a lifting movement of the work piece and of a machine tool component in relation to the work piece processing plane by at least one detected distance variable.

8. The machine tool monitoring device of claim 1, wherein the identification unit comprises at least one sensor element configured for an ultra wide band operation for identifying a distance variable.

9. The machine tool monitoring device of claim 1, wherein the identification unit comprises at least two monitoring area for monitoring an operating process of the machine tool.

10. The machine tool monitoring device of claim 9, wherein the at least two monitoring areas are each assigned to a different operating mode of the machine tool.

11. The machine tool monitoring device of claim 9, wherein at least one of the at least two monitoring areas is assigned to a warning mode of the machine tool.

12. The machine tool monitoring device of claim 1, wherein the identification unit is configured to slow down a tool drive in a warning mode together with a machine tool drive unit for driving a tool.

13. The machine tool monitoring device claim 9, wherein at least one of the at least two monitoring areas is assigned to a removing of a driven tool from a working area of the machine tool.

14. The machine tool monitoring device of claim 9, wherein at least one of the at least two monitoring areas is assigned to a security switch-off of the machine tool.

15. The machine tool monitoring device of claim 1, wherein the identification unit comprises an arithmetic unit that is configured to detect the unexpected or inappropriate use by an evaluation of a set of the distance variables based on at least one of: a fuzzy logic; and a neuronal logic.

16. The machine tool monitoring device of claim 1, wherein the identification unit comprises a data bank, wherein the set of distance variables is assigned in the data bank to an unexpected or inappropriate use.

17. The machine tool monitoring device of claim 1, wherein the identification unit is configured to identify a presence of a human body part in a monitoring area by at least one of the set of distance variables.

18. The machine tool monitoring device of claim 1, further comprising an actuator engineering unit for implementing a security measure, wherein the actuator engineering unit interconnected with the identification unit.

19. The machine tool monitoring device of claim 1, wherein the machine tool monitoring device is coupled to the machine tool.

20. A method of identifying an unexpected or inappropriate use of a machine tool during an operating process of a machine tool, the method comprising:

detecting at least one distance variable for identifying the unexpected or inappropriate use with at least two sensor elements, wherein identification is based on a set of distance variables, and wherein identification is based on a difference between a plurality of distance variables of the set of distance variables, wherein the at least one distance variable is a vertical distance between at least one of the sensor elements and at least one of: a work piece processing plane and a work piece lying on the work piece processing plane, and wherein the at least two sensor elements are each arranged to designate a monitoring area along a conveying direction of the machine tool, and wherein at least two sensor elements of the at least two sensor elements are arranged on a first and second side of a parting plane of the machine tool each for detecting at least one distance variable of the set of distance variables.

* * * * *